(12) United States Patent
Jones et al.

(10) Patent No.: US 7,612,139 B2
(45) Date of Patent: Nov. 3, 2009

(54) CORE/SHELL FLUOROPOLYMER DISPERSIONS WITH LOW FLUOROSURFACTANT CONTENT

(75) Inventors: Clay Woodward Jones, Washington, WV (US); David William Johnson, Washington, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 263 days.

(21) Appl. No.: 11/435,006

(22) Filed: May 15, 2006

(65) Prior Publication Data

US 2006/0264537 A1    Nov. 23, 2006

Related U.S. Application Data

(60) Provisional application No. 60/682,879, filed on May 20, 2005.

(51) Int. Cl.
 *C08L 27/12* (2006.01)
(52) U.S. Cl. .......................... 524/544; 523/310; 524/458; 524/546; 525/482
(58) Field of Classification Search ................. 524/544, 524/546, 458; 523/310; 525/482
See application file for complete search history.

(56) References Cited

U.S. PATENT DOCUMENTS

| | | | |
|---|---|---|---|
| 2,559,752 A | 7/1951 | Berry | |
| 3,037,953 A | 6/1962 | Marks et al. | |
| 3,142,665 A | 7/1964 | Cardinal et al. | |
| 3,704,272 A | 11/1972 | Holmes | |
| 3,882,153 A | 5/1975 | Seki et al. | |
| 4,252,859 A | 2/1981 | Concannon et al. | |
| 4,282,162 A | 8/1981 | Kuhls | |
| 4,380,618 A | 4/1983 | Khan et al. | |
| 4,629,654 A * | 12/1986 | Sasaki et al. | 428/373 |
| 4,837,267 A | 6/1989 | Malhotra | |
| 6,153,688 A | 11/2000 | Miura et al. | |
| 6,833,403 B1 * | 12/2004 | Bladel et al. | 524/458 |
| 6,841,594 B2 * | 1/2005 | Jones et al. | 523/201 |
| 6,861,466 B2 | 3/2005 | Dadalas et al. | |
| 2003/0008944 A1 | 1/2003 | Jones et al. | |
| 2003/0125421 A1 | 7/2003 | Bladel et al. | |
| 2003/0130393 A1 | 7/2003 | Cavanaugh et al. | |
| 2005/0222313 A1 * | 10/2005 | Tomihashi et al. | 524/366 |
| 2005/0228072 A1 * | 10/2005 | Winkler et al. | 523/171 |

FOREIGN PATENT DOCUMENTS

| | | |
|---|---|---|
| EP | 0 322 877 | 7/1989 |
| EP | 0 851 010 A1 | 7/1998 |
| WO | WO 02/072653 A2 | 9/2002 |
| WO | WO-02/072653 A2 * | 9/2002 |
| WO | WO 03/059992 A1 | 7/2003 |
| WO | WO 03/062291 A1 | 7/2003 |
| WO | WO-03/062291 A1 * | 7/2003 |
| WO | WO 2005/066402 A1 | 7/2005 |
| WO | WO-2005/066402 A1 * | 7/2005 |

* cited by examiner

*Primary Examiner*—Peter D. Mulcahy
*Assistant Examiner*—Henry Hu

(57) ABSTRACT

A stabilized aqueous fluoropolymer dispersion comprising:
 about 30 to about 70 weight % non-melt-processible fluoropolymer particles having an SSG of less than about 2.225, said fluoropolymer particles comprising a core of high molecular weight polytetrafluoroethylene and a shell of lower molecular weight polytetrafluoroethylene or modified polytetrafluoroethylene; and
 about 2 to about 11 weight % of aliphatic alcohol ethoxylate nonionic surfactant based on the weight of said fluoropolymer,
 wherein said dispersion is essentially free of surfactants containing aromatic groups and contains less than 300 ppm of fluorosurfactant based on the weight of said dispersion.

39 Claims, No Drawings

CORE/SHELL FLUOROPOLYMER DISPERSIONS WITH LOW FLUOROSURFACTANT CONTENT

FIELD OF INVENTION

This invention relates to non-melt-processible, core/shell fluoropolymer dispersions containing aliphatic alcohol ethoxylate nonionic surfactants and having a low fluorosurfactant content.

BACKGROUND OF THE INVENTION

Fluoropolymers are applied to a wide number of substrates in order to confer release, chemical and heat resistance, corrosion protection, cleanability, low flammability, and weatherability. Coatings of polytetrafluoroethylene (PTFE) homopolymers and modified PTFE provide the highest heat stability among the fluoropolymers, but unlike tetrafluoroethylene (TFE) copolymers, cannot be melt processed to form films and coatings. Therefore, other processes have been developed for applying coatings of PTFE homopolymers and modified PTFE. One such process is dispersion coating which applies the fluoropolymer in dispersion form. Dispersion coating processes typically employ such fluoropolymer dispersions in a more concentrated form than the as-polymerized dispersion. These concentrated dispersions contain a significant quantity of nonionic surfactant, e.g. 6-8 weight percent. As disclosed in U.S. Pat. No. 6,153,688 to Miura et al. and U.S. 2003/0130393 to Cavanaugh et al., it is desirable to use aliphatic alcohol ethoxylate nonionic surfactants to avoid environmental concerns associated with aromatic group-containing nonionic surfactants, e.g., alkyl phenol ethoxylates.

Dispersion coating processes include the steps of applying concentrated dispersion to a substrate by common techniques such as spraying, roller, curtain coating, or dip coating; drying the substrate to remove volatile components; and baking the substrate. When baking temperatures are high enough, the primary dispersion particles fuse and become a coherent mass. Baking at high temperatures to fuse the particles is often referred to as sintering.

For a number of dispersion coating applications such as curtain coating or seriography, a fraction of the coating stream is deposited on the substrate requiring the remainder of the stream to be recycled. The recycled fraction needs to be able to withstand the subsequent multiple pumping and mixing operations necessary for a continuous process. A dispersion suitable for such processing should not easily coagulate when subjected to shearing forces. The resistance of the dispersion to premature coagulation can be measured by a parameter known as gel time and is an indication of the shear stability of the dispersion.

It has been recognized in U.S. Pat. No. 6,841,594 B2 and US2003/0008944 A1 to Jones et. al. and US2003/0130393 A1 to Cavanaugh et al. that certain non-melt processible fluoropolymers of a core/shell configuration having a core of high molecular weight PTFE and a shell of lower molecular weight PTFE or modified PTFE possess excellent shear stability. Fluorosurfactants are typically used as an ingredient in the dispersion polymerization of these fluoropolymers, the fluorosurfactants functioning as a non-telogenic dispersing agent. For example, an early description of this use of fluorosurfactants is found in U.S. Pat. No. 2,559,752 to Berry. However because of environmental concerns and because fluorosurfactants are expensive, processes have been developed for their recovery from waste water and from aqueous fluoropolymer dispersions.

There are several known techniques for the removal of fluorosurfactants from fluoropolymer dispersions. One method is disclosed in U.S. Pat. No. 4,369,266 to Kuhis et al. and includes the addition of a stabilizing surfactant followed by concentration by ultrafiltration. This patent teaches that a high proportion of the fluorosurfactant can be removed via the aqueous permeate. It is also known to remove fluorosurfactant by adsorption onto an ion exchange resin as taught in U.S. Pat. No. 3,882,153 (Seki et al) and U.S. Pat. No. 4,282,162 (Kuhls). Kuhis teaches recovery of fluorinated emulsifiers dissolved in the aqueous phase after coagulation of the polymer from the dispersion or in aqueous polymer dispersions to be concentrated. US 2003/0125421 A1 (Bladel et al.) also teaches removal of fluorine-containing emulsifiers from fluoropolymer dispersion by contacting with an anion exchanger.

In fluoropolymer dispersions with low fluorosurfactant content, the dispersion tends to undergo an unacceptable viscosity increase after fluorosurfactant removal or upon concentration making the dispersions unsuitable for room temperature coating applications. U.S. Pat. No. 6,861,466 B2 to Dadalas et. al. discloses the viscosity of aqueous fluoropolymer dispersions with low fluorosurfactant content may be controlled by the addition of anionic non-fluorinated surfactant. However, the presence of anionic non-fluorinated surfactant in fluoropolymer dispersions is undesirable for some applications, e.g., dispersion coating of glass cloth where undesirable color can be imparted by anionic non-fluorinated surfactant. In metal coating applications, anionic non-fluorinated surfactants can restrict the range of possible coating formulations, i.e., limit formulation flexibility in such applications.

A further problem fluoropolymer dispersion with low fluorosurfactant content is that the Critical Cracking Thickness (CCT) in coating applications is reduced unless agents such as acrylic binders are added. CCT is a measure of the thickness of a coating formed from polymer dispersion that can be applied to a substrate in one pass without cracking during drying and subsequent baking.

Improved fluoropolymer dispersions with low surfactant content are needed.

BRIEF SUMMARY OF THE INVENTION

The invention is based on the discovery that an aqueous dispersion of core/shell fluoropolymer having a low surfactant content can provide significant advantages in processing and/or in end use applications. The invention provides to an aqueous dispersion of non-melt-processible core/shell fluoropolymer particles with low fluorosurfactant content, less than 300 ppm based on the weight of the dispersion. The dispersion of this invention comprises about 30 to about 70 weight % non-melt-processible fluoropolymer particles having an SSG of less than about 2.225, preferably about 45 to about 65 weight % non-melt-processible fluoropolymer particles, and about 2 to about 11 weight % aliphatic alcohol ethoxylate nonionic surfactant, preferably about 3 to about 11 weight %, based on the weight of said fluoropolymer. The fluoropolymer particles comprise a core of high molecular weight polytetrafluoroethylene (PTFE) and a shell of low molecular weight PTFE or modified PTFE. The dispersion is essentially free of surfactants containing aromatic groups.

In preferred embodiments the dispersion contains less than 100 ppm, more preferably less than 50 ppm of fluorosurfactant, and most preferably less that 25 ppm fluorosurfactant based on the weight of the fluoropolymer in the dispersion. In an especially preferred embodiment the dispersion contains less than 100 ppm anionic non-fluorinated surfactant, more preferably less than ppm anionic non-fluorinated surfactant, even more preferably less than 10 ppm anionic non-fluorinated surfactant, and most preferably is essentially free of anionic non-fluorinated surfactant. Surprisingly even with low levels of fluorosurfactant, preferred dispersions of this invention have a viscosity that is less than about 100 mPa·s at 23±3° C., more preferably less than about 40 mPa·s at 23±3° C., which is a desirable viscosity for room temperature coating applications.

Preferably, the fluoropolymer particles in the dispersion have a number average particle size of about 250 to about 300 nm.

In preferred dispersions in accordance with the invention, at least about 1.5 weight % of the fluoropolymer particles comprise substantially rod-shaped particles having a length to diameter ratio of greater than 5. By rod-shaped it is meant that the particles are elongated such that they have a length to diameter ratio of greater than five. Some of the rod-shaped particles appear to be straight and some the rod-shaped particles appear to be bent. In a preferred embodiment, about 1.5 to about 25 weight % of the fluoropolymer particles consist of substantially rod-shaped particles having a length to diameter ratio of greater than 5, more preferably at least about 1.5 to about 20 weight %, and most preferably about 2 to about 20 weight %. In a preferred embodiment of the invention, at least 50% the fluoropolymer particles of this invention are generally cylindrical having a length to diameter ratio of greater than 1.5. More preferably, at least about 90% of the fluoropolymer particles in the dispersion according to invention are generally cylindrical in shape with only a small minority of the particles being generally spherical. The dispersion particles produced preferably have a number average length of about 220 to about 500 nm and a number average diameter of from about 150 to about 300 nm. In a preferred embodiment, the dispersion particles have a number average length of about 250 to about 500 nm and a number average diameter of about 150 to about 250. The rod-shaped dispersion particles have a number average diameter of less than about 150 nm.

Preferred dispersions of this invention exhibit surprisingly high shear stability. Gel times for preferred dispersions are greater than about 600 seconds, more preferably greater than about 700 seconds, and most preferably greater than about 1000 seconds.

Preferred dispersions employ aliphatic alcohol ethoxylate nonionic surfactants having the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18.

Preferred dispersions in accordance with the invention have a high Critical Cracking Thickness (CCT). Preferably, the CCT is at least about 10 µm at 6 wt % nonionic surfactant based on the weight of the fluoropolymer.

DETAILED DESCRIPTION OF THE INVENTION

Fluoropolymer Dispersion and Process for Making

The aqueous dispersion of core/shell fluoropolymer particles can be made by dispersion polymerization (also known as emulsion polymerization) using fluorosurfactants as a nontelogenic dispersing agent. The aqueous fluoropolymer dispersion in accordance with the invention can be referred to as a stabilized aqueous fluoropolymer dispersion which means that it contains sufficient nonionic surfactant to prevent coagulation of the dispersion when low amounts of fluorosurfactant are present in the dispersion. In this invention, aliphatic alcohol ethoxylates are employed as the nonionic surfactant and the dispersion is substantially free of surfactants containing aromatic groups. As will be explained in more detail hereinafter, depending upon the process used to make the dispersion in accordance with the invention, the nonionic surfactant may already be present in the dispersion prior to treatment to reduce surfactant content, e.g., nonionic surfactants have been added for the purposes of concentration, or nonionic surfactant may be added for stabilization prior to the treatment to decrease fluorosurfactant content.

The fluoropolymer particles in the dispersion in accordance with the invention comprise a core of high molecular weight polytetrafluoroethylene (PTFE) and a shell of lower molecular weight polytetrafluoroethylene or modified polytetrafluoroethylene.

Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modifying comonomer can be, for example, hexafluoropropylene (HFP), perfluoro(methyl vinyl ether) (PMVE), perfluoro(propyl vinyl ether) (PPVE), perfluoro(ethyl vinyl ether) (PEVE), chlorotrifluoroethylene (CTFE), perfluorobutyl ethylene (PFBE), or other monomer that introduces side groups into the molecule.

The fluoropolymer particles have a standard specific gravity (SSG) of less than 2.225, preferably less than 2.220, and more preferably from 2.180 to 2.215. The SSG is generally inversely proportional to the molecular weight of PTFE or modified PTFE. SSG alone, however, cannot specify molecular weight as it is also dependent on the presence of modifier, the amount of modifier, and/or initiation by hydrocarbon initiators such as DSP. Also no agreement exists as to the correct mathematical form the relationship takes. The first representation of that relationship is expressed in a paper presented by Doban et al. at an ACS meeting Sep. 18, 1956 which gives the number average molecular weight to be $$\overline{M}_n = 0.597 \: [\log_{10}(0.157/(2.306-SSG)]^{-1}$$

with graphical data given in Sperati & Starkwather, Fortschr. Hochpolym-Forsch. Bd. 2,S.465495 (1961). Another expression of this relationship is stated by Noda et al. in U.S. Pat. No. 5,324,785 as:

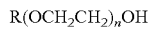
$$Log_{10}M_n = 31.83 - 11.58 \times SSG$$

in which $M_n$ is average molecular weight. These equations result in different molecular weights for the same SSG values.

Molecular weight can be more consistently related to melt creep viscosity (MCV) values for PTFE polymers and melt creep viscosity is used in the present application to describe the molecular weight of the polymer. Molecular weight is linearly related to melt viscosity in Pa·s to the 1/3.4 power as stated in the following:

$$\overline{M}_n = (MCV^{1/3.4} - 663.963)/0.00021967$$

Melt creep viscosities for the fluoropolymer in accordance with the invention are preferably greater than about $1.4 \times 10^{10}$ Pa·s, more preferably greater than about $1.5 \times 10^{10}$ Pa·s. Melt creep viscosity in this application is measured by the procedure U.S. Pat. No. 3,819,594 with certain modifications discussed below.

The fluoropolymer dispersion of this invention is made by dispersion polymerization (also known as emulsion polymerization). The product of dispersion polymerization is used as aqueous dispersion after concentrating and/or stabilizing with added surfactant as will be described below. The concentrated dispersions are useful as coating or impregnating compositions and to make cast films.

In the manufacture of dispersions in accordance with the invention, the polymerization is carried out to form a particle structure in which molecular weight, and in some embodiments, composition vary from one stage of polymerization to another. The variation can be can be envisioned so as to view the particle as having discrete layers. While the properties of the "core" and "shell" cannot be measured independently by analytical methods, these concepts are equated with polymer formed, respectively, in first and later stages in the polymerization. The process produces PTFE of high molecular weight at the core of the particle and PTFE or modified PTFE of lower molecular weight near and/or at the surface of the dispersion particles. As will be discussed below, the distinction made herein between core and shell relates to the amount of initiator present during the first (core) stage part of polymerization and during the later (shell) stage of polymerization as well as the presence or absence of telogenic agent and comonomer being introduced.

Particularly because of the core shell nature of the fluoropolymers of this invention, the melt creep viscosity measured at the end of the batch is a weighted average of melt creep viscosities of the PTFE formed during the batch. For a growing particle, each incremental volume with its molecular weight contributes to the average. If, for instance, the molecular weight is increasing during the batch, each incremental volume has a higher molecular weight than the last incremental volume and the average molecular weight is always lower than that of the last volume increment. The molecular weight of a volume increment is termed the instantaneous molecular weight and the number average molecular weight is given by the expression $$\overline{M_n} = \frac{\lim_{n \to \infty} \sum_{i=1}^{n} M_{ni} \Delta V}{\lim_{n \to \infty} \sum_{i=1}^{n} \Delta V}$$

where $M_{ni}$ is the instantaneous molecular weight and $\Delta V$ is a volume or weight increment. The instantaneous molecular weight for each volume increment is a value selected such that a numerically integrated solution of the above expression yields the experimentally determined average molecular weight at any point during the batch.

For the purposes of the present invention, the average molecular weight $M_n$ of the shell is determined by the numerical integration, using at least 5 volume or weight increments beginning with and including the increment in which the $M_{ni}$ is the highest and concluding with the end of the batch. The $M_n$ for the core is determined similarly using at least 30 volume or weight increments beginning with the start of polymerization and ending with and including the increment in which the $M_{ni}$ is the highest. Average melt creep viscosity is then determined using the formula stated above for the relationship of melt creep viscosity to $M_n$.

In accordance with the invention, the core of the particles comprises high molecular weight polytetrafluoroethylene preferably having an average melt creep viscosity greater than about $1.2 \times 10^{10}$ Pa·s, preferably greater than about $1.3 \times 10^{10}$ Pa·s, and more preferably greater than about $1.5 \times 10^{10}$ Pa·s. The shell comprises lower molecular weight polytetrafluoroethylene or modified polytetrafluoroethylene preferably with an average melt creep viscosity greater than about $9 \times 10^9$ Pa·s and less than the average melt creep viscosity of polytetrafluoroethylene of the core. Preferably, the average melt creep viscosity of the polytetrafluoroethylene or modified polytetrafluoroethylene of the shell is at least $0.1 \times 10^{10}$ Pa·s, more preferably at least $0.2 \times 10^{10}$ Pa·s, less than the average melt creep viscosity of polytetrafluoroethylene of the core. Most preferably, the shell of lower molecular weight polytetrafluoroethylene or modified polytetrafluoroethylene has an average melt creep viscosity of about $9 \times 10^9$ Pa·s to about $1.3 \times 10^{10}$ Pa·s.

In fluoropolymers in accordance with the invention, the shell comprises about 5 to about 30% by weight of the particles. Preferably, the shell comprises about 5 to about 25% by weight of the particles, most preferably, about 5 to about 20% by weight of the particles. Preferably, the shell of the particles is polytetrafluoroethylene.

Fluoropolymers in accordance with this invention have the general character of known polymers made by dispersion polymerization processes. The resins of this invention isolated and dried are non-melt-processible. By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

In a preferred embodiment of the invention, the fluoropolymer is fibrillating. Fine powder resin isolated from dispersion and dried can be formed into useful articles by a lubricated extrusion process known as paste extrusion. The resin is blended with a lubricant and then shaped by an extrusion process. The beading obtained is coherent and microscopic examination reveals that many particles are linked by fibrils of PTFE which have been formed despite the procedure being conducted well below the melt temperature. Thus by "fibrillating", it is meant that a lubricated resin forms a continuous extrudate when extruded through a 1600:1 reduction die at 18.4 weight percent isoparaffin lubricant sold under the trademark Isopar® K by ExxonMobil Chemical. A further strengthening of the beading beyond the "green strength" obtained by fibrillation is accomplished by sintering after the lubricant has been volatized.

For preparation of a preferred fluoropolymer in accordance with the invention, a batch polymerization process is provided for producing a non-melt-processible dispersion. The polymerization process preferably involves the steps of precharging deionized water to a stirred autoclave and precharging saturated hydrocarbon having more than 12 carbon atoms which is liquid under polymerization conditions (preferably paraffin wax) and a dispersing agent (fluorinated surfactant), preferably a perfluorinated carboxylic acid having 6 to 10 carbon atoms. The hydrocarbon acts as a stabilizer in the polymerization process, preventing or retarding the formation of coagulated polymer in the agitated system. The process further involves deoxygenating, pressurizing the autoclave with TFE to predetermined level, agitating, and bringing the system to desired temperature, e.g., 60°-100° C.

To form the core, the polymerization is carried out in a first stage during which a first amount of free radical initiator, and additional dispersing agent (fluorinated surfactant) are added to the autoclave. The first amount of initiator preferably produces polytetrafluoroethylene having an average melt creep viscosity greater than about $1.2 \times 10^{10}$ Pa·s, more preferably $1.3 \times 10^{10}$ Pa·s. Preferably, the first amount of initiator produces polytetrafluoroethylene having an average melt creep viscosity of greater than about $1.0 \times 10^{10}$ Pa·s before about 30% of the total tetrafluoroethylene has been polymerized (including the tetrafluoroethylene displaced from the vapor space by the volume of polymer grown). During the first stage of the polymerization, the addition of agents providing telogenic activity is preferably minimized and most preferably the first stage is carried out without adding telogenic agents. In preferred forms of the present invention, these conditions promote the formation of rod-shaped particles i.e., having a length to diameter ratio greater than about 5. In addition, these conditions preferably promote the formation of large amounts of generally cylindrical particles having a length to diameter ratio greater than about 1.5. The polymerization proceeds and additional TFE is added to maintain pressure. Then, during the second stage of the reaction, a second amount of free radical initiator is added with a telogenic agent and, for modified PTFE, a comonomer. The second amount of initiator produces lower molecular weight polytetrafluoroethylene or modified polytetrafluoroethylene preferably with an average melt creep viscosity of the polytetrafluoroethylene or modified polytetrafluoroethylene of the shell greater than about $9 \times 10^9$ Pa·s and less than the average melt creep viscosity of the polytetrafluoroethylene of the core. Preferably, the average melt creep viscosity of the polytetrafluoroethylene or modified polytetrafluoroethylene of the shell is at least $0.1 \times 10^{10}$ Pa·s less, more preferably at least $0.2 \times 10^{10}$ Pa·s less than the average melt creep viscosity of polytetrafluoroethylene of the core. Most preferably, the polymer produced for the shell of lower molecular weight polytetrafluoroethylene or modified polytetrafluoroethylene has an average melt creep viscosity of about $9 \times 10^9$ Pa·s to about $1.3 \times 10^{10}$ Pa·s. The second amount of initiator is at least about 10 times the first amount of initiator, preferably at least about 25 times the first amount, more preferably at least about 50 times the first amount, and most preferably at least about 100 times the first amount. The second amount of initiator and telogenic agent are added before about 95% of the total tetrafluoroethylene are polymerized. The second amount of initiator and telogenic agent are preferably added when at least about 70% of the total TFE has been polymerized, more preferably at least about 75% and most preferably at least about 80%.

During the first stage of the reaction, a high molecular weight core of PTFE is formed that is preferably at least about 70% of the mass of the fluoropolymer particle, more preferably at least about 75%, and most preferably at least about 80%. During the second stage of the reaction a shell of low molecular weight PTFE or modified PTFE is preferably formed that is complimentarily no more than about 30% of the mass of the fluoropolymer particle, more preferably no more than about 25% and most preferably no more than about 20%.

When the desired amount of TFE is consumed, the feeds are stopped, the reactor is vented and purged with nitrogen, and the raw dispersion is discharged from the polymerization vessel to a cooling vessel. Paraffin wax is removed and polymer dispersion is transferred to a dispersion concentration operation which produces stabilized dispersions which are useful for the practice of the present invention.

Nonionic Surfactants

With environmental concerns about the use of aromatic compounds such as alkyl phenol ethoxylates, nonionic surfactants used in dispersions in accordance with the invention are aliphatic alcohol ethoxylates. They are employed in the dispersion in amounts of about 2 to about 11 weight %, preferably about 3 to about 11 weight %, based on the weight of said fluoropolymer. Suitable nonionic surfactants include any of a variety of aliphatic alcohol ethoxylates or mixtures thereof which provide the desired cloud point during concentration and which provide desired properties in the dispersion, e.g., low burn off temperature, dispersion stability, etc. Especially preferred nonionic surfactants are a compound or mixture of compounds of the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18. For example, the preferred ethoxylate used in this invention can be considered to be prepared from (1) a primary alcohol that is comprised of a hydrocarbon group selected from branched alkyl, branched alkenyl, cycloalkyl or cycloalkenyl or (2) a secondary or tertiary alcohol. In any event, the ethoxylate of this invention does not contain an aromatic group. The number of ethylene oxide units in the hydrophilic portion of the molecule may comprise either a broad or narrow monomodal distribution as typically supplied or a broader or bimodal distribution which may be obtained by blending.

The cloud point of a surfactant is a measure of the solubility of the surfactant in water. The surfactants employed in the aqueous dispersion of this invention have a cloud point of about 50° C. to about 85° C., preferably about 59° C. to about 70° C.

The preferred branched surfactants surprisingly increase the shear stability of the dispersion composition when concentrated with linear alcohol ethoxylates and can equal or exceed the performance of fluoropolymer dispersions concentrated with alkyl phenol ethoxylates. Gel time is a measure of the shear stability of a composition. An aqueous dispersion of the invention wherein the molecular weight of the polytetrafluoroethylene or modified polytetrafluoroethylene in the shell is sufficiently low so that dispersion at about 60 weight % fluoropolymer and about 6 weight % surfactant has a gel time of greater than about 600 seconds, preferably greater than about 700 seconds, and most preferably greater than about 1000 seconds.

Further the surfactants of this invention contain no aromatic group that can thermally decompose and be converted to harmful organic aromatic compounds that may adversely affect air and water quality during dispersion application processes and produce tar-like buildup on coating equipment and exhaust ducts. The surfactants used in this invention burn off cleanly without thermally decomposing on a substrate to leave a discolored coated product and without carbonizing thereby eliminating unwanted transfer of carbon particles to a coated product.

In addition to the above advantages, the preferred alcohol ethoxylate surfactants burn off at a lower temperature (about 50° C. lower) than the conventional alkyl phenol ethoxylates. This can be beneficial in some applications where the surfactant must be removed thermally but the product cannot be sintered. Examples of applications of these types are impregnated fibers for sealing applications and filtration fabrics.

With the conventional alkyl phenol ethoxylates, the surfactant burn-off temperature is very near the sintering temperature. The alcohol ethoxylate surfactants thus offer a wider operating window.

Nonionic surfactants of the type generally used to stabilize fluoropolymer dispersions can be either liquids or solids at room temperature. If solid, the surfactant tends to be pasty and difficult to handle. These are typically not free-flowing granular solids. They can be handled but often require heated tanks and transfer lines to keep them as a liquid. In addition to the capital cost of the heated equipment, there are operational restrictions placed on the system. If the temperature is maintained too low, tanks and transfer lines can become plugged with solid material. If the temperature is too high, degradation of the surfactant can occur.

Generally low viscosity liquids are preferred from a handling point of view. High viscosity liquids are more difficult to handle and often require heated tanks and lines to keep the viscosity low enough for ease in handling. Some of the apparent liquid surfactants are physically meta-stable in that they may exist as liquids for several days and then turn into pasty solids. Sometimes water is added to the surfactant to lower its viscosity and making it easier to handle. However, too much water detracts from the desire to use more concentrated dispersions for coating operations.

The aqueous dispersion of non-melt-processible fluoropolymer particles and nonionic surfactant used in this invention preferably contains a nonionic surfactant containing 0-20 weight % water, preferably 0-15 weight % water and is a stable liquid at room temperature. A surfactant is considered to be a stable liquid if it remains liquid for 3 days at room temperature after being chilled to 5° C. and then warmed to room temperature (about 23±3° C.).

Dispersions containing nonionic surfactant made as described herein thus are stabilized fluorosurfactant-containing dispersions suitable for use in the reduction of the fluorosurfactant content as will be described below.

Dispersion Concentration Procedure

The dispersion in accordance with the invention is preferably produced by concentrating the as-polymerized dispersion. Preferably, the dispersion concentration operation, the dispersion is concentrated with the aid of the aliphatic alcohol ethoxylate nonionic surfactant using the procedure taught in Marks et al., U.S. Pat. No. 3,037,953, and in Holmes, U.S. Pat. No. 3,704,272 to raise the solids content. For example, the solids contents can be increased from about 35 wt % to about 60 wt % using a process of this type. Miura et al., U.S. Pat. No. 6,153,688 discloses a similar process.

Anionic Non-fluorinated Surfactant

Preferably, the dispersions of this invention contain less than 100 ppm anionic non-fluorinated surfactant, more preferably less than 50 ppm, even more preferably, less than 10 ppm. Surprisingly, dispersions containing fluoropolymer particles with a core/shell structure and very low amounts of fluorosurfactant do not require the addition of anionic non-fluorinated surfactant to control viscosity as taught in U.S. Pat. No. 6,861,466 B2 to Dadalas et. al. In a preferred embodiment, dispersions of this invention are essentially free of anionic non-fluorinated surfactants. Anionic non-fluorinated surfactants include surfactants having one or more anionic groups in addition to hydrophilic groups such as polyoxyalkylene groups, or hydrocarbon moieties or silicone based surfactants and are more thoroughly described in U.S. Pat. No. 6,861,466 B2 to Dadalas et al.

Fluorosurfactants

Fluorosurfactant is present in the dispersion is an amount less than 300 ppm based on the weight of the dispersion. The fluorosurfactant in the dispersion is a non-telogenic, anionic dispersing agent, soluble in water and comprising an anionic hydrophilic group and a hydrophobic portion. Preferably, the hydrophobic portion is an aliphatic fluoroalkyl group containing at least four carbon atoms, all except at most one of which, and that one the closest to the solubilizing group, bearing at least two fluorine atoms, the terminal carbon atom bearing in addition an atom consisting of hydrogen or fluorine. These fluorosurfactants are used as a polymerization aid for dispersing and, because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed.

Initiators

The initiators preferably used to make the dispersion of this invention are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (III), can be used. Alternatively, short half-life initiators such as potassium permanganate/oxalic acid can be used.

In addition to the long half-life persulfate initiators preferred for this invention, small amounts of short chain dicarboxylic acids such as succinic acid or initiators that produce succinic acid such as disuccinic acid peroxide (DSP) may be also be added in order to reduce coagulum.

To produce the high molecular weight PTFE core, preferably no telogenic agent is added in the first stage of the reaction. In addition, quantities of agents with telogenic activity are minimized. In contrast, in the second stage of the reaction, such agents in addition to more initiator are added to reduce the molecular weight of that reached in the core. For the purposes of this patent application, the term telogenic agent broadly refers to any agent that will prematurely stop chain growth and includes what is commonly known as chain transfer agents. The term chain transfer implies the stopping of growth of one polymer chain and the initiation of growth of another in that the number of growing polymer radicals remains the same and the polymerization proceeds at the same rate without the introduction of more initiator. A telogenic agent produces lower molecular weight polymer in its presence than in its absence and the number of polymer chain radicals growing either remains the same or decreases. In practice most agents, if present in sufficient quantities, tend to decrease the number of radicals and ultimately the polymerization rate. In order to maintain rate, addition of initiator with or near the time of the agent is desirable. The telogenic agents used in this invention to produce the low molecular weight shell are typically non-polar and may include hydrogen or an aliphatic hydrocarbon or halocarbon or alcohol having 1 to 20 carbon atoms, usually 1 to 8 carbon atoms, e.g., alkanes such as ethane, or chloroform or methanol. Also effective are mercaptans such as dodecylmercaptan.

In producing a shell of modified PTFE, in addition to telogenic agent, comonomer is added in the second stage of the reaction. As stated above typical comonomers include hexafluoropropylene (HFP), perfluoro(methyl vinyl ether) (PMVE), perfluoro(propyl vinyl ether) (PPVE), perfluoro(ethyl vinyl ether) (PEVE), chlorotrifluoroethylene (CTFE), and perfluorobutyl ethylene (PFBE).

Fluorosurfactant Reduction

The fluorosurfactant content of the aqueous dispersion of the present invention is reduced to a predetermined level of no greater than about 300 ppm, preferably to a predetermined level no greater than about 100 ppm, more preferably to a predetermined level no greater than about 50 ppm, most preferably to a predetermined level no greater than about 25 ppm.

While any suitable method can be used to reduce fluorosurfactant content, contacting the aqueous dispersion with an anion exchange resin is advantageously used for this purpose. Contacting of the dispersion with anion exchange resin with can occur before or after concentration but typically the lower solids material before concentration is easier to process, especially when a fixed bed is employed for carrying out the contacting step. If the process is carried out prior to concentration, nonionic surfactants are added prior to contact with the anion exchange resin as discussed above.

Any of a variety of techniques which bring the dispersion in contact with the anion exchange resin can be used to carrying out ion exchange of the process. For example, the process can be carried out by addition of ion exchange resin bead to the dispersion in a stirred tank, in which a slurry of the dispersion and resin is formed, followed by separation of dispersion from the anion exchange resin beads by filtration. Another suitable method is to pass the dispersion through a fixed bed of anion exchange resin instead of using a stirred tank. Flow can be upward or downward through the bed and no separate separation step is needed since the resin remains in the fixed bed.

The contacting of the dispersion is performed at a temperature which is sufficiently high to facilitate the rate of ion exchange and to reduce the viscosity of the dispersion but being below a temperature at which the resin degrades at a detrimentally high rate. Upper treatment temperature will vary with the type of polymer employed. Typically, temperatures will be between 20° C. and 80° C. Preferably, the temperature is between about 45° C. and 65° C., more preferably between about 50° C. and 60° C.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by use of ammonia solution as demonstrated by Seki in U.S. Pat. No. 3,882,153, by a mixture of dilute mineral acid with organic solvent (e.g., HCl/ethanol) as demonstrated by Kuhis in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, and other methods of concentration, etc.

Ion Exchange Resins

The ion exchange resins for use in accordance with reducing the fluorosurfactant content of the aqueous dispersion of the present invention include anionic resins but can also include other resin types such as cationic resins, e.g., in a mixed bed. The anionic resins employed can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basic resins are preferred when it is desired to reduce fluorosurfactant to very low levels and for high utilization of the resin. Strongly basic ion exchange resins also have the advantage of less sensitivity to the pH of the media. Strong base anion exchange resins have an associated counter ion and are typically available in chloride or hydroxide form but are readily converted to other forms if desired. Anion exchange resins with hydroxide, chloride, sulfate, and nitrate can be used for the removal of the fluorosurfactant but anion exchange resins in the form of hydroxide are preferred to prevent the introduction of additional anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available stong base anion exchange resins with quaternary ammonium groups with a dimethyl ethanol amine moiety include US Filter A244-OH, AMBERLITE® 410, DOWEX® MARATHON A2, and DOWEX® UPCORE Mono A2.

Ion exchange resin used in the process of the present invention is preferably monodisperse. Preferably, the ion exchange resin beads have a number average size distribution in which 95% of the beads have a diameter within plus or minus 100 μm of the number average bead diameter.

The monodisperse ion exchange resin has a particle size which provides a suitable pressure drop through the bed. Very large beads are fragile and prone to breakage. Very small ion exchange beads are susceptible to tight particle packing resulting in tortuous channels in the bed. This can result in high shear conditions in the bed. Preferred ion exchange resin has a number average bead size about 450 to about 800 μm, more preferably, the ion exchange resin beads have a number average bead diameter of about 550 to about 700 μm.

Blends with Melt-Processible Fluoropolymer Dispersions

In a preferred embodiment, the aqueous fluoropolymer dispersion of the present invention further contains particles of melt-processible fluoropolymer blended with the particles of core/shell non-melt-processible fluoropolymer. Preferably, when blends are desired, the aqueous fluoropolymer dispersion comprises about 1 wt % to about 10 wt % of said melt-processible fluoropolymer. By melt-processible, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processible copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE. Further useful polymers are film forming polymers of polyvinylidene fluoride(PVDF) and copolymers of vinylidene fluoride as well as polyvinyl fluoride (PVF) and copolymers of vinyl fluoride.

Especially preferred is the TFE copolymer PFA. As disclosed in U.S. Pat. No. 4,252,859 to Concannon et al., the addition of PFA to non-melt processible polymer results in the decrease of crystallinity and the increase in modulus of elasticity which is believed to contribute to making a coating formed from the blended dispersion more elastic and durable and less brittle.

Similar to forming aqueous dispersions of non-melt processible fluoropolymer particles, melt processible fluoropolymer particles are also made by dispersion polymerization, except that one or more comonomers are added to the batch initially and/or introduced during polymerization. In addition, a telogen such as a hydrocarbon is employed to control the molecular weight to achieve the desired melt flow of the polymer for the intended purpose. The same dispersion concentration operation performed with the aid of a nonionic surfactant as used for of non-melt processible fluoropolymer dispersions can be used for TFE copolymer dispersions.

The aqueous dispersion containing a blend of non-melt-processible fluoropolymer core/shell particles and melt-processible fluoroparticles is formed either by blending aqueous dispersions of the two types of fluoropolymer particles either before or after reducing the fluorosurfactant content of the dispersion. The resulting dispersion of blended fluoropolymer particles may be further concentrated as taught in Marks et al., U.S. Pat. No. 3,037,953, and in Holmes, U.S. Pat. No. 3,704,272. Alternatively, the blend can be formed by combining two separate dispersion after concentration.

Surprisingly, aqueous dispersion containing a blend of non-melt-processible fluoropolymer core/shell particles and melt-processible fluoroparticles and containing very low amounts of fluorosurfactant also requires no need of the addition of anionic non-fluorinated surfactant to control viscosity for room temperature coating application.

Coating Applications

The dispersions of this invention can be used as coating compositions on any number of substrates including metal and glass. The dispersions are applied to substrates and baked to form a baked layer on the substrate. When baking temperatures are high enough, the primary dispersion particles fuse and become a coherent mass. Coating compositions of dispersions of this invention can be used to coat fibers of glass, ceramic, polymer or metal and fibrous structures such as conveyor belts or architectural fabrics, e.g., tent material. The coatings of this invention when used to coat metal substrates have great utility in coating cooking utensils such as frying pans and other cookware as well as bakeware and small electrical household appliances such as grills and irons. Coatings of this invention can also be applied to equipment used in the chemical processing industry such as mixers, tanks and conveyors as well as rolls for printing and copying equipment.

Alternately the dispersions can be used to impregnate fibers for sealing applications and filtration fabrics. Further the dispersions of this invention can be deposited onto a support and subsequently dried, thermally coalesced, and stripped from the support to produce self-supporting films cast from the dispersion. Such cast films are suitable in lamination processes for covering substrates of metal, plastic, glass, concrete, fabric and wood.

Dispersions in accordance with the invention do not require anionic non-fluorinated surfactants for stability control after fluorosurfactant removal or during concentration. This enables more formulation flexibility in metal coating applications and, in color glass cloth coating applications, the undesirable color which can be imparted by such surfactants.

The dispersions of this invention preferably demonstrate high shear stability. The high shear stability permits these dispersions to withstand forces applied by shear generated by pumping and mixing operations during coating application. High shear stability facilitates internal recycling of coatings necessary for continuous operations for many application processes.

The fluoropolymer dispersion in accordance with the invention preferably retain a high Critical Cracking Thickness (CCT) after fluorosurfactant removal and can avoid the need to add, e.g., acrylic binders. Preferably the CCT is at least 10 μm at 6 wt % nonionic surfactant based on the weight of the fluoropolymer. Again, avoiding the presence of these additives in the dispersion enables more formulation flexibility in metal coating applications and undesirable color glass cloth coating applications.

Test Methods

Raw Dispersion Properties:

Solids content of PTFE raw (as polymerized) dispersion are determined gravimetrically by evaporating a weighed aliquot of dispersion to dryness, and weighing the dried solids. Solids content is stated in weight % based on combined weights of PTFE and water. Alternately solids content can be determined by using a hydrometer to determine the specific gravity of the dispersion and then by reference to a table relating specific gravity to solids content. (The table is constructed from an algebraic expression derived from the density of water and density of as polymerized PTFE.) Raw dispersion particle size (RDPS) is measured by photon correlation spectroscopy.

Surfactant Content:

The surfactant and solids content of stabilized dispersion are determined gravimetrically by evaporating a small weighed aliquot of dispersion to dryness following in general ASTM D-4441 but using a time and temperature such that water but not the surfactant is evaporated. This sample is then heated at 380° C. to remove the surfactant and reweighed. Surfactant content is usually stated in weight % based on PTFE solids.

Resin Properties:

Standard specific gravity (SSG) of PTFE fine powder resin is measured by the method of ASTM D-4895. If a surfactant is present, it can be removed by the extraction procedure in ASTM-D4441 prior to determining SSG by ASTM D-4895.

Melt creep viscosity (MCV) is measured at 380° C. by a modification of the tensile creep method disclosed in U.S. Pat. No. 3,819,594, with the mold at room temperature, using a molding pressure of 200 kg/cm$^2$ (19.6 MPa), with the molding pressure held for 2 min, using a load (total weight suspended from the sample sliver) that varies with the MV to obtain a creep rate suitable for measurement, and waiting at least 30 min after application of the load for elastic response to be complete before selecting viscous response (creep) data for use in the calculation.

Rheometer pressure (extrusion pressure) is measured by the method of ASTM D-4895 Section 10.8 using 18.4 weight % isoparaffin lubricant sold under the trademark Isopar® K (ExxonMobil Chemicals) and a die with 1600:1 reduction ratio.

Beading quality is determined as in U.S. Pat. No. 3,142,665. The quality of the extrudate is visually rated as "F" for discontinuous and from 0 to 10 for continuous extrudate, i.e., from very poor to excellent regularity and freedom from flaws.

Copolymer Composition:

Comonomer content of the modified PTFE resins is determined by Fourier transform infrared spectroscopy using the method disclosed in U.S. Pat. No. 4,837,267. For PPVE-modified PTFE, a multiplicative factor of 0.97 derived from the calibration curve is used to convert the ratio of the absorbance at 995 cm$^{-1}$ to that at 2365 cm$^{-1}$ to PPVE content in weight %.

Thermal Concentration Procedure:

In order to determine both critical cracking thickness and shear stability, the raw dispersion as polymerized (approximately 45% solids in the examples of this invention) is concentrated. The specific gravity of the raw dispersion is measured. From the relationship between specific gravity and % solids, the weight of water and PTFE solids in one kilogram of dispersion is calculated. 1.0 milliliter of a 10% by weight solution of citric acid in water is added to one kilogram of the raw dispersion. The dispersion is gently stirred to mix the citric acid. Next 5 milliliters of concentrated ammonium hydroxide (28%) is added followed by stirring. A non-ionic surfactant is then added. The non-ionic surfactant used in the examples of this invention is Triton® X-100, supplied by Dow Chemical, unless otherwise specified. This surfactant is described as an octyl phenol ethoxylate. The neat surfactant is a liquid at room temperature and has a viscosity of 240 cps. The amount used is 6.0% or 8.0% based on the weight on the water present in the one kilogram sample. The dispersion is heated to approximately 40° C. and then stirred to disperse the surfactant. The dispersion is covered with a piece of aluminum foil and heated to 80° C. The dispersion is allowed to remain at 80° C. until concentration is complete, usually one hour. The dispersion is allowed to cool to room temperature and the upper clear supernate phase is removed with a water aspirator. The concentrated lower phase is stirred and the % solids and % surfactant determined by the methods described above. The % solids and % surfactant are then adjusted to the desired levels, usually 60% solids and 6.0% or 8.0% surfactant based on the weight of the PTFE solids.

Critical Cracking Test Procedure (CCT):

The CCT test procedure used in the examples is a procedure to test the maximum film thickness that is obtained by coating a PTFE dispersion on a glass substrate. Dispersions are applied to plates by using Meyer rods and Fixed Path applicators, both available from Paul Gardner and Company of Pompano Beach Florida.

Glass plates (8 in×12 in) are individually identified and reused during testing. If a pattern of unusual results is detected from a particular plate it is noted as anomalous. A new plate is conditioned by use of standard dispersion, Teflon® T-30 from the DuPont Company, Wilmington Delaware using a #10 Meyer rod and completing the procedure described below. After a plate has been used, it is scraped with a straight blade razor, rinsed with water, and wiped dry for reuse.

To determine the final CCT, an approximation of the CCT range is used. That approximation may be based on prior knowledge or determined preliminarily by use of fixed path applicators of 1, 2, 3, and 4 mils.

The following table gives the average finished film weight obtained by coating a plate with Meyer Rods and Fixed Path Applicators (both purchased from Paul Gardner and Company) using 60 weight % solids stabilized dispersion as a standard.

TABLE 1

| Meyer Rod | Fixed Path (mil) | Applicator Film Weight Average (mg/inch$^2$) |
|---|---|---|
| #8 |  | 7.41 |
|  |  | 8.1 |
| #10 | 1 | 10.5 |
| #12 |  | 13 |
| #14 |  | 14.2 |
| #16 |  | 16 |
|  |  | 16.6 |
| #18 |  | 17.8 |
| #20 | 2 | 19.7 |
|  |  | 24.5 |
|  |  | 33.4 |
| #24 |  | 35.7 |
|  | 3 | 43.7 |
| #30 | 4 | 46 |
|  |  | 54 |
|  | 5 |  |
|  | 6 |  |

From the approximate range known or determined for the dispersion films, filtered dispersion (using a 5 micron syringe filter or other similar sized filter) is applied to identified glass plates using the appropriate Meyer Rods and Fixed Path applicators. Two passes of dispersion are applied horizontally across the top of the plate, approximately 2-3 inches from the top, and drawn down with either the Meyer rod or the Fixed Path applicator at as constant a rate as possible, approximately 1.5-2 seconds/plate. The plates are dried for 4 minutes at 100° C. to remove water and baked for 9 minutes at 380° C. to sintering. The plates are removed from the oven and allowed to stand until they reach room temperature. After cooling, each plate in the sequence of thinner to thicker is held up to a light and examined for five seconds to determine the presence of cracks. The first cracked film is identified. A cracked film resembles tiny whiskers. Using a straight blade razor and a template, 2 one square inch specimens are scribed from each of the last uncracked and first cracked film to produce 4 test specimens. Using a tweezers, the specimens are transferred to an analytical balance and weighed. The weight of the 4 test specimens is averaged and multiplied by a factor of 0.737 to give the final CCT in micrometers.

The derivation of 0.737 micrometers/g factor is shown below by solving for thickness.

Volume=L×W×T
T=CCT
V=# mg of film measured/specific gravity of film
Spec. gravity assumed=2.16 g/mL=$2.16 \times 10^{-9}$ mg/cubic micrometers
L=$2.54 \times 10^4$ micrometers
W=$2.54 \times 10^4$ micrometers Shear Stability:

The shear stability of concentrated dispersions is determined by a gel time test. The dispersion is concentrated as described above and 200 ml of dispersion is placed in a Waring commercial explosion resistant blender (Model 707SB, one quart size, 2 speed, air requirements—10 scfm @ 10 psi, available from Waring of New Hartford, Conn.) and stirred at the highest speed until the dispersion gels. The gel time is recorded in seconds. The test is terminated after 30 minutes if the dispersion does not gel. Between gel time tests the blender is disassembled and thoroughly cleaned.

Particle Morphology and Distribution:

Dispersion images are obtained with a Hitachi S-4700 field emission scanning electron microscope at 700 volts accelerating voltage. Samples are prepared by 1000 fold aqueous dilution of dispersion. One drop of diluted dispersion is placed on a piece of polished silicon wafer, water evaporated, and then slowly coated with 2 nanometers of iridium over a 15 minute period using VCRGroup IBS/TM2005 Ion Beam Sputterer. Images are visually inspected and particles are hand counted. Counted particles are modeled as cylinders whose height is the long axis and whose diameter is the short axis. Particle dimensions are measured with a ruler in mm and converted to nm using the scale indicated in the SEM image.

EXAMPLES

Comparative A

A PTFE dispersion type of nominal particle size 220 nm containing about 60 wt % PTFE solids and having a nominal non-ionic surfactant content of about 6 wt % based on PTFE solids is commercially available as T-30 supplied by Dupont. The nonionic surfactant is an alkyl phenol ethoxylate surfactant sold under the trademark Triton X-100. The Critical Cracking Thickness (CCT) of this dispersion is typically 11 to 13 μm. To 49 lb of this PTFE dispersion containing 924 ppm APFO having a surface tension of about 29 dyne/cm and a viscosity of about 20 mPa·s is put into an unjacketed 5 gallon tank with 4 baffles with a vertically-disposed 4 bladed flat pitch agitator of 7.5 in of diameter of rotation and is added 530 g of an ion exchange resin A244BXRROH available from US Filter. The temperature of the dispersion begins at 42° C. and the agitator turns at 115 rpm. As shown below, the APFO content is measured from samples taken hourly.

| Time  | PPM APFO |
|-------|----------|
| Start | 924      |
| 1 hr  | 670      |
| 2 hr  | 436      |
| 3 hr  | 251      |
| 4 hr  | 89       |
| 5 hr  | 52       |

The product is 59.5 wt % solids, 5.92 wt % Triton X-100, and has a pH of 10.7. 100 g of a cationic ion exchange resin C211H is added to reduce the pH and after 30 minutes the pH is 10.1. After filtration, the final viscosity is 150 mPa·s and the surface tension is 33.3 dyne/cm. The critical cracking thickness CCT is found to be less than 6 μm.

Comparative B

The same conditions as used for the example of Comparative A are employed using a dispersion which is the same as Comparative A but which contains an aliphatic alcohol ethoxylate nonionic surfactant instead of Triton X-100. The aliphatic alcohol ethoxylate nonionic surfactant is a blend of surfactants sold as TMN 100X by Dow Chemical Corporation. The surfactants are described as alcohol ethoxylates that differ only in the ethylene oxide content made from the alcohol 2,6,8-trimethyl-4-nananol, a branched secondary alcohol. The final APFO content is found to be 75.4 ppm. The dispersion is difficult to filter and the viscosity is found to be 353 mPa·s, the solids 57.6 wt %, the surfactant level is 6.4 wt % and the surface tension 45.5 dyne/cm.

Example 1

The same conditions as used for Comparatives A and B are employed but the dispersion used is comprised of core-shell polymer having 6 wt % of the same aliphatic alcohol ethoxylate surfactant as used in Comparative B. The core shell fluoropolymer dispersion is made as follows. A polykettle having a horizontal agitator and a water capacity of 240 parts by weight is charged with 123.5 parts of demineralized water and 5.82 parts of a paraffin wax supplied by Exxon. The contents of the polykettle are heated to 65° C. and the polykettle is evacuated and purged with tetrafluoroethylene (TFE). Into the evacuated polykettle is charged 3.24 parts of a solution containing 0.0616 parts of ammonium perfluorooctanoate. The contents of the polykettle are agitated at 50 rpm. The temperature is increased to 90° C. TFE is then added until the pressure is 2.72 MPa. Then 1.29 parts of a fresh initiator solution of 0.01 parts of disuccinyl peroxide and 0.00005 parts ammonium persulfate (APS) per part of water are added at the rate of 0.129 parts/minute. Once the pressure has declined by 0.1 MPa, the batch is considered to have kicked off. TFE is then added at a rate sufficient to maintain the pressure at 2.72 MPa. Once 8.81 parts of TFE have reacted from the kick off, 6.47 parts of a 2.46 weight % of ammonium perfluorooctonate solution is added at a rate of 0.324 parts per minute. TFE is added at a rate sufficient to maintain the pressure at 2.75 MPa. After 88.1 parts of TFE have been added following initial pressurizing with TFE, an additional 3.24 parts of a solution of 0.005 parts of APS and 0.060 parts of methanol per part of solution are added at the rate of 0.647 parts per minute. The polymerization time from kick off to second initiator addition is 68 minutes. After 96.9 parts of TFE have been added, the TFE feed is stopped and the polykettle pressure is allowed to decrease to 0.79 MPa. Once that pressure has been reached, the agitator is turned off and the batch vented. The length of the reaction from kick off to cessation of agitation is 87 minutes. The contents of the polykettle are discharged and the supernate wax layer is removed. Solids content of the raw dispersion is 45.8% and the Raw Dispersion Particle Size is 263 nm. The PTFE resin obtained has an SSG of 2.1917 and a melt creep viscosity of $19.5 \times 10^9$ Pa·sec. The average melt creep viscosity of the core of the resin particles is $2.27 \times 10^{10}$ Pa·s and the average melt creep viscosity of the shell of the resin particles is $9.8 \times 10^9$ Pa·s. The core comprises 88.3% by weight of the particles, the shell comprising 11.7% by weight.

The dispersion is thermally concentrated by increasing the surfactant concentration to 7 wt % based on water and the temperature held at 65° C.

APFO reduction is performed as in Comparative B. The initial and final properties are found in Table 1. The final APFO content is found to be 23.3 ppm, The initial pH is 9.6 and the final 10.8.

TABLE 1

| | Surf. Ten. dyne/cm | pH | Gel Time sec. | Viscosity RT mPa·s | Viscosity 40 C. mPa·s | Solids wt % | Surfactant wt % (solids) | CCT μm |
|---|---|---|---|---|---|---|---|---|
| initial | 28.1 | | 735 | 19 | 15 | 60.2 | 6.1 | 17 |
| final | 29 | | 660 | 24 | 19 | 60.3 | 6 | 14 |

Comparative C

The same dispersion type used in Comparative B is employed at 43.6 wt % solids and 3.2 wt % aliphatic alcohol ethoxylate surfactant. 158 lb of this dispersion is added to a 15 gallon jacketed tank with two baffles with a vertically-disposed 4 bladed flat pitch agitator. 1250 g of the same anionic ion exchange resin is added and the temperature is held at 60° C. From samples taken periodically the following AFPO concentrations are found as shown below.

| | PPM APFO |
|---|---|
| Start | 2206 |
| 0.5 hr | 1067 |
| 1 hr | 177 |
| 1.5 hr | 63 |
| 2 hr | 38 |

The dispersion was thermally concentrated by increasing the nonionic surfactant concentration to 7 wt % based on water and the temperature held at 65° C. After concentration, drawing off the supernate and adjustment of the pH and surfactant concentration the final properties are as shown in Table C below.

TABLE C

| Surf. Ten. dyne/cm | pH | Gel Time sec. | Viscosity RT mPa·s | Viscosity 40 C. mPa·s | Solids wt % | Surfactant wt % (solids) | CCT μm |
|---|---|---|---|---|---|---|---|
| 30 | 10.2 | 305 | 130 | 105 | 58 | 6 | <6 |

Example 2

Essentially the same conditions as used for Comparative C are employed but the PTFE dispersion used is comprised of the same core-shell polymer dispersion of the invention as used in Example 1. The initial solids are 42.8 wt % and the surfactant is 4.4 wt % based on solids. After treatment the APFO concentration is found to be 16 ppm. After concentration, drawing off the supernate and adjustment of the pH and surfactant concentration, the final properties are shown in Table 2 below.

TABLE 2

| Surf. Ten. dyne/cm | pH | Gel Time sec. | Viscosity RT mPa·s | Viscosity 40 C. mPa·s | Solids wt % | Surfactant wt % (solids) | CCT μm |
|---|---|---|---|---|---|---|---|
| 20 | 10.1 | 960 | 20 | 14 | 60 | 5.8 | 14 |

Example 3

Essentially the same conditions as used for Comparative C are employed but the PTFE dispersion used is comprised of the same core/shell fluoropolymer dispersion as used in Example 1 with the addition 1470 g of 36.5 solids raw PFA dispersion available from DuPont as TE7196. The initial blended solids are 42.6 wt % and the surfactant is 4.4 wt % based on solids. After treatment the APFO concentration is found to be 14 ppm. After concentration, drawing off the supernate and adjustment of the pH and surfactant concentration, the final properties are as shown in Table 3 below.

TABLE 3

| Surf. Ten. dyne/cm | pH | Gel Time sec. | Viscosity RT mPa·s | Viscosity 40 C. mPa·s | Solids wt % | Surfactant wt % (solids) | CCT μm |
|---|---|---|---|---|---|---|---|
| 20 | 10.3 | 1034 | 20 | 15 | 60 | 5.1 | 12 |

What is claimed is:

1. A stabilized aqueous fluoropolymer dispersion comprising:
    about 30 to about 70 weight % non-melt-processible fluoropolymer particles having an SSG of less than about 2.225, said fluoropolymer particles comprising a core of high molecular weight polytetrafluoroethylene and a shell of lower molecular weight polytetrafluoroethylene or modified polytetrafluoroethylene; and
    about 2 to about 11 weight % of aliphatic alcohol ethoxylate nonionic surfactant based on the weight of said fluoropolymer,
    wherein said dispersion is free of surfactants containing aromatic groups, contains less than 100 ppm of fluorosurfactant based on the weight of said dispersion and wherein said dispersion has a viscosity of less than 100 mPa·s at 23±3° C.

2. The aqueous fluoropolymer dispersion of claim 1 wherein said dispersion contains less than 50 ppm fluorosurfactant based on the weight of said dispersion.

3. The aqueous fluoropolymer dispersion of claim 1 wherein said dispersion contains less than 25 ppm fluorosurfactant based on the weight of said dispersion.

4. The aqueous fluoropolymer dispersion of claim 1 wherein said dispersion contains less than 100 ppm anionic non-fluorinated surfactant based on the weight of said dispersion.

5. The aqueous fluoropolymer dispersion of claim 1 wherein said dispersion contains less than 50 ppm anionic non-fluorinated surfactant based on the weight of said dispersion.

6. The aqueous fluoropolymer dispersion of claim 1 wherein said dispersion contains less than 10 ppm anionic non-fluorinated surfactant based on the weight of said dispersion.

7. The aqueous fluoropolymerdispersion of claim 1 wherein said dispersion is free of anionic non-fluorinated surfactant.

8. The aqueous fluoropolymer dispersion of claim 1 wherein said dispersion has a viscosity of less than 40 mPa·s at 23±3° C.

9. The aqueous dispersion of claim 1 wherein the molecular weight of the polytetrafluoroethylene or modified polytetrafluoroethylene in the shell is sufficiently low that said dispersion at about 60 weight % fluoropolymer and at about 6 weight % surfactant has a gel time greater than about 600 seconds.

10. The aqueous dispersion of claim 1 wherein the molecular weight of the polytetrafluoroethylene or modified polytetrafluoroethylene in the shell is sufficiently low that said dispersion at about 60 weight % fluoropolymer and at about 6 weight % surfactant has a gel time greater than about 700 seconds.

11. The aqueous dispersion of claim 1 wherein the molecular weight of the polytetrafluoroethylene or modified polytetrafluoroethylene in the shell is sufficiently low that said dispersion at about 60 weight % fluoropolymer and at about 6 weight % surfactant has a gel time greater than about 1000 seconds.

12. The aqueous dispersion of claim 1 wherein said dispersion has a Critical Cracking Thickness of at least about 10 μm at 6 wt % nonionic surfactant based on the weight of the fluoropolymer.

13. The aqueous dispersion of claim 1 wherein said aliphatic alcohol ethoxylate nonionic surfactant comprises a compound or mixture of compounds of the formula:

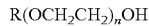

R(OCH$_2$CH$_2$)$_n$OH wherein R is a branched alkyl, branched alkenyl, cycloalkyl, or cycloalkenyl hydrocarbon group having 8-18 carbon atoms and n is an average value of 5 to 18.

14. The aqueous dispersion of claim 1 comprising from about 45 to about 65 weight % non-melt processible fluoropolymer.

15. The aqueous dispersion of claim 1 wherein the average melt creep viscosity of the polytetrafluoroethylene of said core is greater than about $1.2 \times 10^{10}$ Pa·s.

16. The aqueous dispersion of claim 1 wherein the average melt creep viscosity of the polytetrafluoroethylene of said core is greater than about $1.3 \times 10^{10}$ Pa·s.

17. The aqueous dispersion of claim 1 wherein the average melt creep viscosity of the polytetrafluoroethylene of said core is greater than about $1.5 \times 10^{10}$ Pa·s.

18. The aqueous dispersion of claim 1 wherein the average melt creep viscosity of the polytetrafluoroethylene or modified polytetrafluoroethylene of said shell is greater than about $9 \times 10^9$ Pa·s and less than the average melt viscosity of polytetrafluoroethylene of said core.

19. The aqueous dispersion of claim 1 wherein the average melt creep viscosity of the polytetrafluoroethylene or modified polytetrafluoroethylene of said shell is at least $0.1 \times 10^{10}$ Pa·s less than the average melt creep viscosity of polytetrafluoroethylene of said core.

20. The aqueous dispersion of claim 1 wherein the average melt creep viscosity of the polytetrafluoroethylene or modified polytetrafluoroethylene of said shell is at least $0.2 \times 10^{10}$ Pa·s less than the average melt creep viscosity of polytetrafluoroethylene of said core.

21. The aqueous dispersion of claim 1 wherein the average melt creep viscosity of the polytetrafluoroethylene or modified polytetrafluoroethylene of said shell is about $9 \times 10^9$ Pa·s to about $1.3 \times 10^{10}$ Pa·s.

22. The aqueous dispersion of claim 1 wherein said shell comprises about 5 to about 30% by weight of said fluoropolymer particles.

23. The aqueous dispersion of claim 5 having a cloud point of about 50° C. to about 85° C.

24. The aqueous dispersion of claim 5 having a cloud point of about 59° C. to about 70° C.

25. The aqueous dispersion of claim 1 wherein the shell is polytetrafluoroethylene.

26. The aqueous dispersion of claim 1 wherein the fluoropolymer is fibrillating.

27. The aqueous dispersion of claim 1 wherein said fluoropolymer has a melt creep viscosity of greater than about $1.4 \times 10^{10}$ Pa·s.

28. The dispersion of claim 1 wherein said particles have a number average particle size of about 250 to about 300 nm.

29. The aqueous dispersion of claim 1 wherein at least about 1.5 weight % of said fluoropolymer particles comprise substantially rod-shaped particles having a length to diameter ratio of greater than about 5.

30. The dispersion of claim 1 wherein at least 50% of said fluoropolymer particles are generally cylindrical having a length to diameter ratio of greater than about 1.5.

31. The dispersion of claim 1 further comprising particles of melt processible fluoropolymer.

32. A coating composition of the aqueous dispersion of claim 1.

33. A substrate coated with the composition of claim 32.

34. The substrate of claim 33 wherein the substrate is metal.

35. The substrate of claim 33 wherein said substrate is cookware.

36. The substrate of claim 33 wherein the substrate is glass fabric.

37. The coating composition of claim 32 in the form of a baked layer.

38. A substrate coated with the aqueous dispersion of claim 1 wherein the surfactant has been thermally removed.

39. A self-supporting film cast from the aqueous dispersion of claim 1.

* * * * *

UNITED STATES PATENT AND TRADEMARK OFFICE
CERTIFICATE OF CORRECTION

PATENT NO.       : 7,612,139 B2
APPLICATION NO. : 11/435006
DATED            : November 3, 2009
INVENTOR(S)      : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 361 days.

Signed and Sealed this

Nineteenth Day of October, 2010

David J. Kappos
*Director of the United States Patent and Trademark Office*